United States Patent [19]
Brockly

[11] 3,782,631
[45] Jan. 1, 1974

[54] SILICA WELDING APPARATUS

[75] Inventor: Albert T. Brockly, Lansing, Ill.

[73] Assignee: Koppers Company, Inc., Pittsburgh, Pa.

[22] Filed: June 21, 1972

[21] Appl. No.: 264,836

[52] U.S. Cl. ............... 239/85, 239/336, 239/416.1, 239/417.5, 239/428, 239/433
[51] Int. Cl. .............................................. B05b 7/16
[58] Field of Search ............ 239/433, 416.1, 417.5, 239/336, 85, 79, 80, 143, 428, 373, 346, 364, 365; 222/193

[56] References Cited
UNITED STATES PATENTS

| | | | |
|---|---|---|---|
| 3,129,889 | 4/1964 | Cape | 239/85 |
| 3,121,593 | 2/1964 | McIlvaine | 222/193 X |
| 2,938,305 | 5/1960 | Bipes | 239/373 X |
| 3,501,097 | 3/1970 | Daley | 239/85 |
| 3,595,481 | 7/1971 | Enblom | 239/346 X |
| 2,372,957 | 4/1945 | Keefer | 222/193 |
| 1,756,381 | 4/1930 | Pahl | 239/85 |
| 2,786,779 | 3/1957 | Long et al | 239/85 X |
| 2,233,304 | 2/1941 | Bleakley | 239/365 X |

Primary Examiner—Allen N. Knowles
Assistant Examiner—Andres Kashnikow
Attorney—Sherman H. Barber et al.

[57] ABSTRACT

A novel apparatus includes a cylindrical canister in which internal piping carries a gas that pressurizes a quantity of silica, preferably sand, therein. A nozzle at the bottom of the canister receives the silica under control of a valve, and the oxygen flowing into the canister and through the nozzle carries the silica to a torch tip where the silica melts in an oxy-fuel flame burning thereat. The oxygen propels the molten silica into cracks and openings in need of filling for repairs.

2 Claims, 2 Drawing Figures

SILICA WELDING APPARATUS

BRIEF SUMMARY OF THE INVENTION

A canister for holding silica in the form of sand has a fill opening at the top and a funnel-like bottom that terminates in a valve for controlling the flow of silica from the canister. A tube is disposed internally of the canister that terminates just below the top. The tube end portion is perforated and is surrounded in spaced-apart relation by a cap to prevent silica from entering the perforations. Externally, the tube connects to a conduit carrying oxygen through a shut-off cock to a nozzle device situated below and communicating with the valve.

The canister carries silica such as sand and, by manipulating the valve, the flow of silica and oxygen from the canister to a welding torch is readily controlled. A fuel gas is also conveyed to the torch where the fuel and oxygen burn and melt the silica. The molten silica is deposited in cracks and crevices of refractory material in order to weld up such cracks and crevices.

For a further understanding of the invention and for features and advantages thereof, reference may be made to the following description and the drawing which illustrates a preferred embodiment of equipment in accordance with the invention.

DETAILED DESCRIPTION

Figure 1:
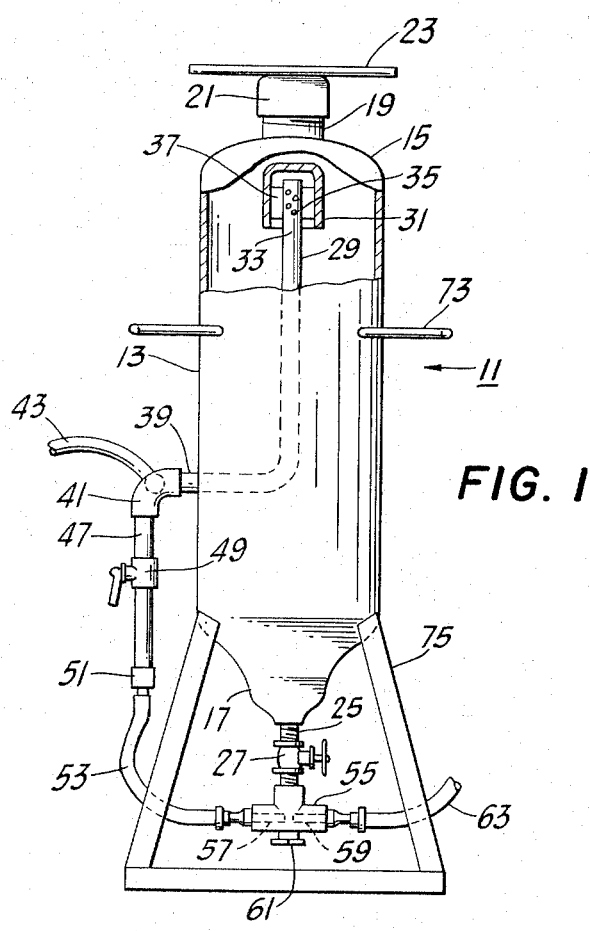
FIG. 1 is a schematic elevational view, partly in section of novel apparatus in accordance with the invention.

Referring to FIG. 1, apparatus 11 in accordance with the invention includes a vertical cylindrical container or canister 13 which is provided with a rounded top portion 15 and a funnel-shaped bottom portion 17. The top portion 15 is fitted with a short nipple-like tubular member 19 which is threaded and which cooperates with a cap 21. The cap 21 is fitted with a bar 23 that aids in tightening the cap 21 onto the threaded nipple-like member 19 and the cap is also fitted internally (not shown) with sealing means whereby the interior of the canister 13 may be pressurized with a gaseous fluid such as oxygen, as is described hereinafter.

The funnel-shaped bottom portion 17 of the canister is shaped about as shown, and it terminates in another nipple-like member 25 to which is threadedly connected a valve 27.

Internally of the canister 13 is a vertically extending tubular member 29 that terminates in a cap 31 located near and just below the top portion 15. The end portion 33 of the tubular member 29 is perforated, as at 35, and the cap or hood 31 is fixed in spaced-apart relation to the end portion 33 by means of spacers 37.

Figure 2:
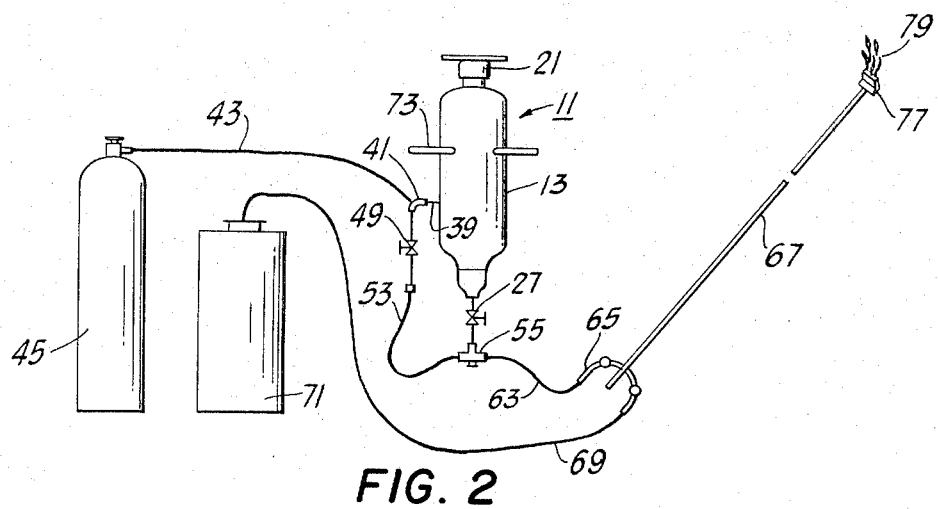
FIG. 2 is a schematic view of a system for carrying into practice the method of the invention using the apparatus of FIG. 1.

The tubular member 29 is connected to external piping 39 and to a three-way elbow 41. One connection to the three-way elbow 41 is a flexible tube 43 that connects to a pressurized supply of oxygen 45, as shown in FIG. 2. From the three-way elbow 41, conduit 47 extends downward (as shown in FIG. 1) to a shut-off cock 49, and thence to a connection 51 with a flexible tube 53.

The flexible tube 53 connects to a nozzle device 55 within which there are two axially aligned, horizontally disposed, and spaced-apart tubular members 57, 59 terminating in close proximity. The nozzle device 55 is threadedly connected to the valve 27 as shown, and is provided with a clean-out threaded plug 61, for a purpose described hereinafter.

Another flexible tube 63 connects the nozzle device 55 to one connection 65 of a conventional elongate silica welding torch 67. Another flexible tubular member 69 connects to the torch 67 at one end and to a supply of gaseous fuel, such as a pressurized container 71 of propane, at the other end.

It will be noted from FIG. 1 that the canister 13 is fitted with a pair of U-shaped handles 73 and that the canister is provided with a base supporting structure 75, shaped about as shown in FIG. 1. These fittings are useful in handling and positioning the apparatus 11 preparatory to and during use thereof.

In operating the apparatus of my invention to carry into practice the method of my invention, the canister is filled through the member 19 with silica sand to a level that is just about the top of the hood 31, the valve 27 being shut. After the external cap 21 is screwed on tight, the flow of oxygen from the supply bottle 45 is turned on; the valves 49 and 27 being closed, the oxygen then pressurizes the sand within the canister.

The torch 67 may be lighted initially after opening both the supply of fuel gas 71 and the shut-off cock 49 whereby oxygen and fuel mix at the torch end 77 and create a flame 79 there.

The welder who manipulates the torch to repair cracks and the like in refractory brickwork of a coke oven battery, inserts the flaming torch into the oven to the place where repairs are to be made. The welder then signals a laborer who gradually and carefully opens valve 27 whereby sand under pressure flows into the nozzle device 55. The oxygen flowing into the nozzle device 55 picks up the sand flowing through valve 27 and carries it into the torch 67 and out to the torch end piece 77. There, the sand, which is of very fine consistency, melts as it emerges through the flame 79 and is deposited as molten silica on the refractory.

Even though the sand is propelled from the torch tip with considerable velocity, it is so fine that it melts in the heat of the oxy-fuel flame, and the molten silica is carried back into deep cracks and spaces between refractory bricks quite easily.

The rate at which sand is allowed to flow from the canister is controlled by valve 27. Whenever it is desired and necessary to weld large cracks or spaces between bricks, the laborer who regulates the flow of sand increases the quantity thereof by simply opening the valve 27.

After use in any application, the valve 27 is closed and the fuel and oxygen supply are shut off. The clean-out plug 61 may then be removed to permit any sand in the nozzle device 55 to be blown out by oxygen or by using ordinary air under pressure from a convenient source of supply.

From the foregoing description of one embodiment of the invention, those skilled in the art should recognize many important features and advantages of it, among which the following are particularly significant:

That the apparatus of my invention is much simpler and easier to use than apparatus known from the prior art for the same purpose;

That the apparatus is more efficient and feeds sand much more uniformly, whereby much better quality of silica-sand welding results; and That additional time for silica sand welding is achieved in any given period of time as a result of the uniform feeding and distribution of sand from the apparatus of my invention to the welding torch.

Although the invention has been described herein with a certain degree of particularity, it is understood that the present disclosure has been made only as an example and that the scope of the invention is defined by what is hereinafter claimed.

What is claimed is:

1. A silica welding apparatus comprising:
   a. a canister having a top and a bottom, said top having an opening closed and sealed by a removable cap, and said bottom being funnel shaped;
   b. means supporting said canister in an upright position;
   c. a first conduit entering said canister and having a perforated end portion terminating adjacent said top;
   d. a hood surrounding in spaced-apart relation said perforated terminal end portion;
   e. a second conduit communicating with the interior of said canister at the bottom;
   f. a valve installed in said second conduit for regulating the flow of material from said canister;
   g. a nozzle device installed in said second conduit including
      1. a nozzle block having a cavity therein,
      2. a pair of axially aligned fixed conduits extending thereinto and terminating in close proximity therein, and
      3. a clean-out plug removably fastened thereinto for cleaning out said nozzle device;
   h. third conduit means communicating with said first conduit and said nozzle device;
   i. fourth conduit means communicating with said nozzle device and a silica welding torch; and
   j. means for conveying a carrier gas under pressure in said first conduit, whereby the interior of said canister is pressurized, and in said second and third conduits whereby material disposed in said canister is carried by said pressurized carrier gas therefrom through said valve when opened into said torch.

2. In a silica welding apparatus, the improvement comprising:
   a. a nozzle device installed in a conduit carrying silica material and through which fluid under pressure passes, including
   b. a nozzle block having a cavity therein;
   c. a pair of axially aligned fixed conduits for carrying said fluid extending into said cavity and terminating therewithin in close proximity;
   d. a clean-out plug removably fastened into said nozzle block for cleaning out said cavity in said nozzle block; and
   e. an opening in said nozzle block through which said silica material passes into said cavity.

* * * * *